United States Patent Office 3,166,539
Patented Jan. 19, 1965

3,166,539
POLYMERIZATION OF ACRYLATE MIXTURES OF POLYMER/MONOMER USING A CATALYST SYSTEM OF A TERTIARY-AMINE AND A QUADRIVALENT SULFUR COMPOUND
Werner Schuchardt, Grenzach, Baden, Germany, assignor to Deutsche Gold- und Silber-Scheideanstalt vormals Roessler, Frankfurt am Main, Germany
No Drawing. Filed July 17, 1961, Ser. No. 124,322
Claims priority, application Germany, Dec. 31, 1948, P 30,108
6 Claims. (Cl. 260—89.5)

The present invention relates to an improved process for the polymerization of acrylic compounds and more particularly relates to a process for the polymerization of acrylic compounds in the presence of an improved catalyst system.

In accordance with French Patent No. 883,679, a process for the polymerization of vinyl compounds in the presence of compounds capable of forming a labile amino oxide has been described. Furthermore, it was found that the presence of peroxides, preferably benzoyl peroxide (dibenzoyl peroxide), was advantageous.

In accordance with the invention it was found that the catalytic action could be considerably increased in the polymerization of monomeric lower alkyl esters such as the methyl, ethyl and propyl esters of acrylic and/or methacrylic acid in admixture with polymers of such monomers when a catalyst system comprising a compound containing quadrivalent sulfur in combination with a compound capable of forming a labile amino oxide was employed. It is of advantage if the compound containing quadrivalent sulfur employed is soluble in the monomeric acrylic compound to be polymerized. Especially good results have been obtained with sulfur dioxide as it has good solubility in acrylic monomers. The sulfur dioxide can therefore be used in dissolved form, or, if desired, can be passed into the acrylic monomer which already contains a compound capable of forming a labile amino oxide, such as, a tertiary amine, just before the polymerization. Other compounds containing quadrivalent sulfur can be employed instead of sulfur dioxide, such as, for example, sulfoxides, esters of sulfurous acid and sulfinic acids and their esters, such as, the dilower alkyl sulfoxides, diaryl sulfoxides, aryl sulfinic acids and aryl sulfinic acid lower alkyl esters in which the indicated aryl groups are of the benzene series, representative illustrations of which are given in the examples which follow. Tertiary amines, especially tertiary aliphatic amines containing 4–8 carbon atoms in the alkyl groups, such as tributyl amine and trihexyl amine, tertiary aromatic amines and tertiary aromatic-aliphatic amines in which the aromatic radicals preferably are phenyl radicals and the aliphatic radicals are lower alkyl radicals, have been found especially useful as compounds capable of forming a labile amino oxide.

In view of the substantially increased catalytic activity of the catalyst combination according to the invention, the total quantity of catalyst in the system can be considerably reduced. Furthermore, it is of advantage that the polymerization can be effected at lower temperatures than previously when the catalyst combination is employed. The polymerization initiates earlier and can be so accelerated according to the invention that emulsions which previously could not be polymerized continuously upon a commercial scale, such as, for example, in a flow tube, can be continuously polymerized by the process of the invention.

The process according to the invention is particularly applicable to bulk polymerization. It can be of advantage in some instances to provide for removal of the heat of reaction during the polymerization, as has been described in Swiss Patent No. 294,343. Such removal of the heat of reaction is of special advantage when a catalyst system is employed which contains an organic peroxide in addition to the tertiary amine and quadrivalent sulfur compound, as such a catalyst system causes a very rapid polymerization with rise in temperature. When the polymerization is carried out only with the aid of a tertiary amine and a quadrivalent sulfur compound, such as, sulfur dioxide, but in the absence of a peroxide, the course of the polymerization is not as rapid as when all these components are employed. However, the products obtained exhibit especially good properties, particularly with regard to colorlessness and stability under the influence of light.

The polymerization can also be promoted by subjecting the tertiary amine and quadrivalent sulfur containing composition either in the presence or absence of an organic peroxide to irradiation with U.V. light rays. However, the use of organic peroxides alone is preferred. The temperature employed for the polymerization, for example, can be room temperature to moderately elevated temperatures.

In carrying out the process according to the invention, the individual catalyst components can be dissolved in separate portions of the acrylic compound to be polymerized and such separate portions then be combined just before the polymerization is to be effected. When a mixture of monomers and powdered polymers are employed, for example, in dough form, the benzoyl peroxide can, for example, be admixed with the powdered polymer and the other two polymerization accelerators can be dissolved in the monomeric vinyl compound before the polymeric and monomeric components are mixed.

Suitable dyes, fillers, as well as reenforcing agents, such as, for example, finely dispersed or surface active agents, can be added to the masses to be polymerized according to the invention. The presence of inhibitors, such as, hydroquinone or ascorbic acid, do not deleteriously affect the process according to the invention. The process according to the invention is suitable for the production of shaped bodies of all types and is also advantageously used in lacquers and adhesives. A quick solidification and hardening of a film or coating can be achieved as the liquid portion thereof or a substantial portion thereof polymerizes and does not or only partly consists of a solvent which must be volatilized. Drying oils, plasticizers, capillary active substances and the like also can be incorporated in the masses to be polymerized according to the invention. The products according to the invention are well suited for the preparation of spachtling masses, impregnating masses, joint sealing masses, pore fillers and the like. Especially good results are obtained with them in the dental industry in the production of molding masses, prostheses, artificial teeth, tooth and tooth root fillings and the like. The process according to the invention is also useful in other fields of prosthetics, for example, in the production of synthetic member masses, facial plastics and the like.

Several modifications of the process according to the invention are illustrated in the following examples:

Example 1

50 grams of powdered polymeric methyl methacrylate having 1% of benzoyl peroxide admixed therein were mixed with 10 grams of monomeric methyl methacrylate in which 0.2 gram of trihexylamine had been dissolved, and 10 grams of monomeric methyl methacrylate in which 2% of sulfur dioxide had been dissolved. The polymerization was completed in 25 minutes at room temperature. The product obtained had the mechanical properties of the known polymethacrylates. When a temperature of 35° C. was maintained during the polymerization, it was completed in only 2 minutes.

Example 2

25 grams of powdered polymeric methyl methacrylate were mixed with 5 cc. of a 2% solution of trihexylamine in monomeric methyl methacrylate and 5 cc. of a 2% solution of sulfur dioxide in monomeric methyl methacrylate. In the presence of U.V. light and at a temperature of 35° C. under access of air, the polymerization was completed in 35 minutes. In addition to having good mechanical properties, the polymerized product also was marked by its colorlessness and its stability in the presence of light.

In the following comparative examples a polymer/monomer mixture containing 10 g. polymethyl methacrylate and 6 g. of monomeric methyl methacrylate was polymerized with the initiation system indicated. The polymerization was carried out starting at room temperature (20–25° C.).

Example 3

| Initiation system | Polymerization Time, Mins. | Temperature Max., °C. |
|---|---|---|
| 0.1 g. benzoyl peroxide, 0.018 g. dimethyl-p-toluidine. | 70 | 60 |
| 0.1 g. benzoyl peroxide, 0.018 g. dimethyl-p-toluidine, 0.061 g. diethyl sulfoxide. | 63 | 49 |
| 0.1 g. benzoyl peroxide, 0.018 g. dimethyl-p-toluidine, 0.016 g. p-toluene-sulfinic acid. | 52 | 72 |

Example 4

| Initiation system | Polymerization Time, Mins. | Temperature Max., °C. |
|---|---|---|
| 0.1 g. benzoyl peroxide, 0.022 g. diethyl-p-toluidine. | 141 | 45 |
| 0.1 g. benzoyl peroxide, 0.022 g. diethyl-p-toluidine, 0.12 g. diphenyl dulfoxide. | 114 | 49.5 |
| 0.1 g. benzoyl peroxide, 0.022 g. diethyl-p-toluidine, 0.12 g. p-toluene-sulfinic acid methyl ester. | 127 | 57 |

Example 5

| Initiation system | Polymerization Time, Mins. | Temperature Max., °C. |
|---|---|---|
| 0.1 g. lauroyl peroxide, 0.02 g. diethyl aniline. | 1,440 | (Hard) |
| 0.1 g. lauroyl peroxide, 0.02 g. diethyl aniline, 0.061 g. diethyl sulfoxide. | 420 | 44.2 |
| 0.1 g. lauroyl peroxide, 0.02 g. diethyl aniline, 0.12 g. p-toluene sulfinic acid methyl ester. | 420 | 30.3 |

Example 6

| Initiation system | Polymerization Time, Mins. | Temperature Max., °C. |
|---|---|---|
| 0.1 g. p-chlorobenzoyl peroxide, 0.17 g. dimethyl benzyl amine. | (Still soft after 4 days.) | |
| 0.1 g. p-chlorobenzoyl peroxide, 0.17 g. dimethyl benzyl amine, 0.116 g. p-toluene sulfinic acid. | 110 | 31.5 |

Example 7

| Initiation system | Polymerization Time, Mins. | Temperature Max., °C. |
|---|---|---|
| 0.1 g. p-chlorobenzoyl peroxide, 0.032 g. triphenyl amine. | (Still soft after hours.) | |
| 0.1 g. p-chlorobenzoyl peroxide, 0.032 g. triphenyl amine, 0.116 g. p-toluene sulfinic acid. | 56 | 84.30 |

Example 8

| Initiation system | Polymerization Time, Mins. | Temperature Max., °C. |
|---|---|---|
| 0.1 g. p-chlorobenzoyl peroxide, 0.025 g. diphenyl methyl amine. | (Still soft after 7½ hours.) | |
| 0.1 g. p-chlorobenzyl peroxide, 0.025 g. diphenyl methyl amine, 0.116 g. p-toluene sulfinic acid. | 79 | 89.3 |

Example 9

| Initiation system | Polymerization Time, Mins. | Temperature Max., °C. |
|---|---|---|
| 0.1 g. decanoyl peroxide, 0.018 g. dimethyl-p-toluidine. | 118 | 82 |
| 0.1 g. decanoyl peroxide, 0.018 g. dimethyl p-toluidine 0.12 g. diphenyl sulfoxide. | 107 | 68.5 |

Example 10

| Initiation system | Polymerization Time, Mins. | Temperature Max., °C. |
|---|---|---|
| U.V. irradiation. | (Still soft after 5 hrs.) | |
| U.V. irradiation, 0.018 g. dimethyl-p-toluidine. | 67 | (Hard) |
| U.V. irradiation, 0.018 g. dimethyl-p-toluidine, 0.12 g. diphenyl sulfoxide. | 45 | (Hard) |
| U.V. irradiation, 0.018 g. dimethyl-p-toluidine, 0.116 g. p-toluene sulfinic acid. | 30 | (Hard) |

I claim:

1. In a process for the bulk polymerization of a polymerizable mass comprising a mixture of (1) a monomer selected from the group consisting of lower alkyl esters of acrylic and methacrylic acid and (2) a polymer of such monomer, the step which comprises carrying out such polymerization in the presence of a catalytic amount of a catalyst system comprising a tertiary amine, a compound containing quadrivalent sulfur which is soluble in such monomer selected from the group consisting of sulfur dioxide, dilower alkyl sulfoxides, diaryl sulfoxides, aryl sulfinic acids, aryl sulfinic acid lower alkyl esters, the aryl groups in said diaryl sulfoxides, aryl sulfinic acids and aryl sulfinic acid lower alkyl esters being of the benzene series, and in the presence of a source of oxygen selected from the group consisting of organic peroxides and air.

2. The process of claim 1 in which such polymerization is started at room temperature.

3. The process of claim 1 comprising in addition subjecting said polymerizable mass to irradiation with ultra violet light rays during the polymerization.

4. The process of claim 1 in which said tertiary amine is a tertiary alkyl amine.

5. The process of claim 1 in which said tertiary amine is a tertiary alkyl phenyl amine.

6. In a process for the bulk polymerization of a polymerizable mass comprising a mixture of (1) a monomer selected from the group consisting of lower alkyl esters of acrylic and methacrylic acid and (2) a polymer of such monomer, the step which comprises carrying out such polymerization in the presence of a catalytic amount of a catalyst system comprising a tertiary amine, sulfur dioxide and in the presence of a source of oxygen selected from the group consisting of organic peroxides and air.

References Cited by the Examiner

UNITED STATES PATENTS

| | | | |
|---|---|---|---|
| 2,423,497 | 7/47 | Harmon | 260—93.5 |
| 2,430,591 | 11/47 | Stewart | 260—83.1 |
| 2,558,139 | 6/51 | Knock et al. | 260—89.5 |
| 2,666,025 | 1/54 | Nozaki | 260—89.5 |
| 2,768,156 | 10/56 | Bredereck et al. | 260—89.5 |
| 2,987,500 | 6/61 | Rossetti | 260—89.5 |

FOREIGN PATENTS 585,396  2/47  Great Britain.

OTHER REFERENCES

Ser. No. 337,552, Berg (A.P.C.), published Apr. 20, 1943.

JOSEPH L. SCHOFER, *Primary Examiner.*

P. E. MANGAN, LEON J. BERCOVITZ, *Examiners.*